US005676238A

United States Patent [19]

Saastamo

[11] Patent Number: 5,676,238

[45] Date of Patent: Oct. 14, 1997

[54] HOLD DOWN ROLLERS FOR A LOG CONVEYOR

[75] Inventor: Petri Saastamo, Woodland, Wash.

[73] Assignee: U.S. Natural Resources, Inc., Vancouver, Wash.

[21] Appl. No.: 801,171

[22] Filed: Feb. 18, 1997

Related U.S. Application Data

[63] Continuation of Ser. No. 473,445, Jun. 7, 1995, abandoned.

[51] Int. Cl.[6] .......... B65G 43/00

[52] U.S. Cl. .......... 198/502.2; 198/624; 198/836.2

[58] Field of Search .......... 198/502.2, 836.1, 198/836.2, 782, 624

[56] References Cited

U.S. PATENT DOCUMENTS

| | | | |
|---|---|---|---|
| 3,516,539 | 6/1970 | Gulstrom | 198/836.2 X |
| 3,990,568 | 11/1976 | Wilson, Sr. | 198/624 |
| 4,078,592 | 3/1978 | Standal | 198/782 X |
| 4,640,056 | 2/1987 | Stump | 198/836.2 X |
| 4,907,632 | 3/1990 | Reuter | 198/782 X |
| 5,417,265 | 5/1995 | Davenport et al. | 198/836.2 X |

*Primary Examiner*—D. Glenn Dayoan
*Attorney, Agent, or Firm*—Robert L. Harrington

[57] ABSTRACT

A lumber piece conveyor including a conveyor chain having retaining lugs and overhead rollers for pressing the lumber pieces on to the retaining lugs. The overhead rollers independently descend and retract as the logs approach the rollers in sequence. The retracted position of each roller is established by the prior roller's position of initial engagement with a log. The retracted position can thus be established at a substantially consistent distance above the point of engagement regardless of the log diameter. Preferably a linkage has one end that is connected to the roller movement of a prior roller assembly and the other end dictates the pivotal positioning of a proximity switch. As the prior roller is moved into engagement, the linkage pivots the proximity switch. The proximity switch signals a computer that the subsequent roller is too high or too low and the roller is accordingly lowered or raised to the desired retracted position.

6 Claims, 8 Drawing Sheets

HOLD DOWN ROLLERS FOR A LOG CONVEYOR

This application is a continuation of application Ser. No. 08/473,445 filed on Jun. 7, 1995 now abandoned.

FIELD OF THE INVENTION

This invention relates to a conveyor having mechanism that holds logs and the like in a desired orientation as the logs are fed into a cutting device, e.g., into a gang saw, chippers, band saw and the like and more particularly to a sequence of pressing rollers arranged sequentially to engage and press the logs down against an underlying chain conveyor.

BACKGROUND OF THE INVENTION

Whereas the present description refers to logs being conveyed by the chain conveyor, the reader will understand that the invention applies to other wood pieces such as cants, slabs and the like where maintaining orientation and alignment of the wood piece during conveyance is desirable. It is thus intended that references to logs encompasses as appropriate lumber pieces in general.

Logs which are to be converted into lumber are measured, e.g., by scanners to determine their profile and then analyzed, e.g., by a computer, to determine the desired orientation and pattern of cuts to be made to optimize the lumber production from each log. The log is positioned on a conveyor in a desired orientation and the conveyor's "hold down" mechanism secures the log in that orientation. A conventional conveyor mechanism includes a conveyor chain and overlying hold down rollers which cooperatively pinch the logs and prevent shifting and rolling of the logs as they are conveyed, e.g., into a gang saw.

In a typical sequence, a log to be sawn is placed on the conveyor chain and turned on its longitudinal axis to establish a desired rotative orientation. A series of rollers press down against the top of the log from an overhead position to pinch the log between the conveyor chain and rollers. The rollers permit longitudinal feeding but prevents side shifting or rolling of the log. As the log moves along the conveyor, the rollers in sequence are released from the trailing end of the log as succeeding rollers move into engagement with the leading end of the log until the log is released from the conveyor. It is considered desirable that at least two rollers are pressing against the log at all times. Thus, before the log moves out from under the first roller, a third roller will be pressed against the log, etc.

The rollers are raised and lowered by pneumatic or hydraulic cylinders actuated by a computer command. The position of the leading and trailing edge of the log is known throughout its travel on the conveyor and the lowering of the rollers is actuated by knowing where the leading edge of the log is relative to a roller, how fast the log is traveling, and how long it takes for the roller to travel from its overhead position to the point of engagement with the log. For example, if the log moves from an overhead position 26" above the chain conveyor to the top of a 20" log in 0.1 second, then it is desirable that the roller movement will be actuated when the leading edge of the log is 0.1 seconds away from the point of engagement by the roller.

There are two factors that cause problems for this system as described. The rate of vertical travel of the roller is essentially fixed. Thus, if the log is a 10" log instead of a 20" log, the travel time of the roller (between its overhead position at 26" and its point of engagement at 10") will be more than double, i.e., more than 0.2 seconds. In this extra period of time, the log may have moved past the first-of-three rollers and the log may have shifted. Even if the log diameter were known, due to the curvature of the log, the log end may be raised off the chain conveyor, e.g., by 6" and then the roller is required to move from 26" to 16" instead of to 10". If the roller is timed to engage the leading edge of a 10" log, it will likely be lowered too soon and thus below the 16" height before the log end reaches the point of engagement and the log end may crash into the roller.

For these and other reasons, it is desirable to position the rollers to an adjusted, retracted position that is consistently at a given height above the log end to be next engaged and as close as practical to the point of engagement.

BRIEF DESCRIPTION OF THE INVENTION

In the preferred embodiment the pneumatic two-position cylinder (retracted or engaged) of the prior systems is replaced with pneumatic cylinders that can be set to any retracted position within its range of movement. A first roller in a sequence of multiple rollers functions as before, i.e., it is moved from a fully raised position to an engaged position without knowing the height of the leading edge of the log. This first roller may be a smooth roller but in any event, the problem of "not knowing" the height of the log end is restricted to this first roller. When the first roller engages the log end, the point of engagement is conveyed to the second roller and the height of the second roller is adjusted to, e.g., 2–3" above the height of the log end. When the second roller engages the log end, the point of engagement is conveyed to the third roller, etc.

The air cylinders of the present invention have dual air inlets and exhausts on each side of the piston, i.e., top and bottom sides of the piston. A single air source is connected to both inlets and either or both inlets can be provided with the pressure from the air source. With air connected to the bottom side and exhausted from the top side, the cylinder position moves up and vice versa. At any position of movement both sides can be pressurized to establish a fixed position. Opening and closing the inlets is accomplished by solenoid actuated valves.

One source for actuating the solenoids of the above cylinder is a magnetic or proximity switch. The switch is carried by a pivotal arm that pivots about the pivot shaft of the roller to be adjusted, but independent of the roller. The position of the pivot arm is dictated by its connection (a mechanical link) to the prior roller. A configured metal plate is pivotally carried on the same pivot shaft as the pivot arm but the plate is rotatively fixed to the roller. The magnetic switch on the pivot arm either "sees" the metal plate or it doesn't see it. If it sees the metal plate, the roller is too high and it signals the air cylinder to lower the roller until the switch sees the plate. That position is the desired position 2–3" above the point of engagement. If it initially does not see the plate, the roller is too low and it signals the solenoid to raise the roller until the switch doesn't see the plate. That position is then the desired position 2–3" above the point of engagement. As the log end approaches the point of engagement, as in the prior systems, the computer actuates the solenoids to cause the rollers to descend and engage the log.

The presetting of the rollers allows all of the rollers (except the initial roller) to function consistently and accurately to engage the leading edge essentially at the same position on the log. Moreover, it accomplishes this improvement without adding expensive sensors and complex computer programming. A significant improvement is provided at a minimum added cost. Whereas the initial roller is not provided with this improvement, added precautions can be taken to insure the desired contact with the leading end of a log by this initial roller. The major problem with presetting this initial roller is that the log is in the process of being rotatively positioned on the conveyor chain at the point of engagement by the leading roller. The operator has some control and the use of a double cylinder arrangement will provide some benefit.

Double cylinders have been in use and have been applied to all of the rollers in prior conveyor systems. A first cylinder is a setting cylinder and the second cylinder is the retract/engage cylinder. Assume this system is designed to accommodate logs between 4" and 20". The first cylinder will preset the rollers at either a 26" height or at a 16" height. The operator or scanner will be able to judge if a log is at least less then, e.g., 14" diameter or at least greater than, e.g., 14" diameter. If he judges the log to be greater than 14", the first cylinder is retracted to 26" and the second cylinder has to move the roller as between 26" and the height of the log. That movement should typically not require more than about 10" of movement. If the log is known to be less than 14", the first cylinder is extended to the 16" position and the second cylinder adjusts downward to the small diameter log which again should not be more than 10" of movement. Nevertheless, the variation from 2–10" of movement is sufficient to create problems and the present invention offers a significant benefit.

The invention and its advantages will become more apparent upon reference to the following detailed description and drawings referred to therein.

DETAILED DESCRIPTION OF THE INVENTION

Figure 1:
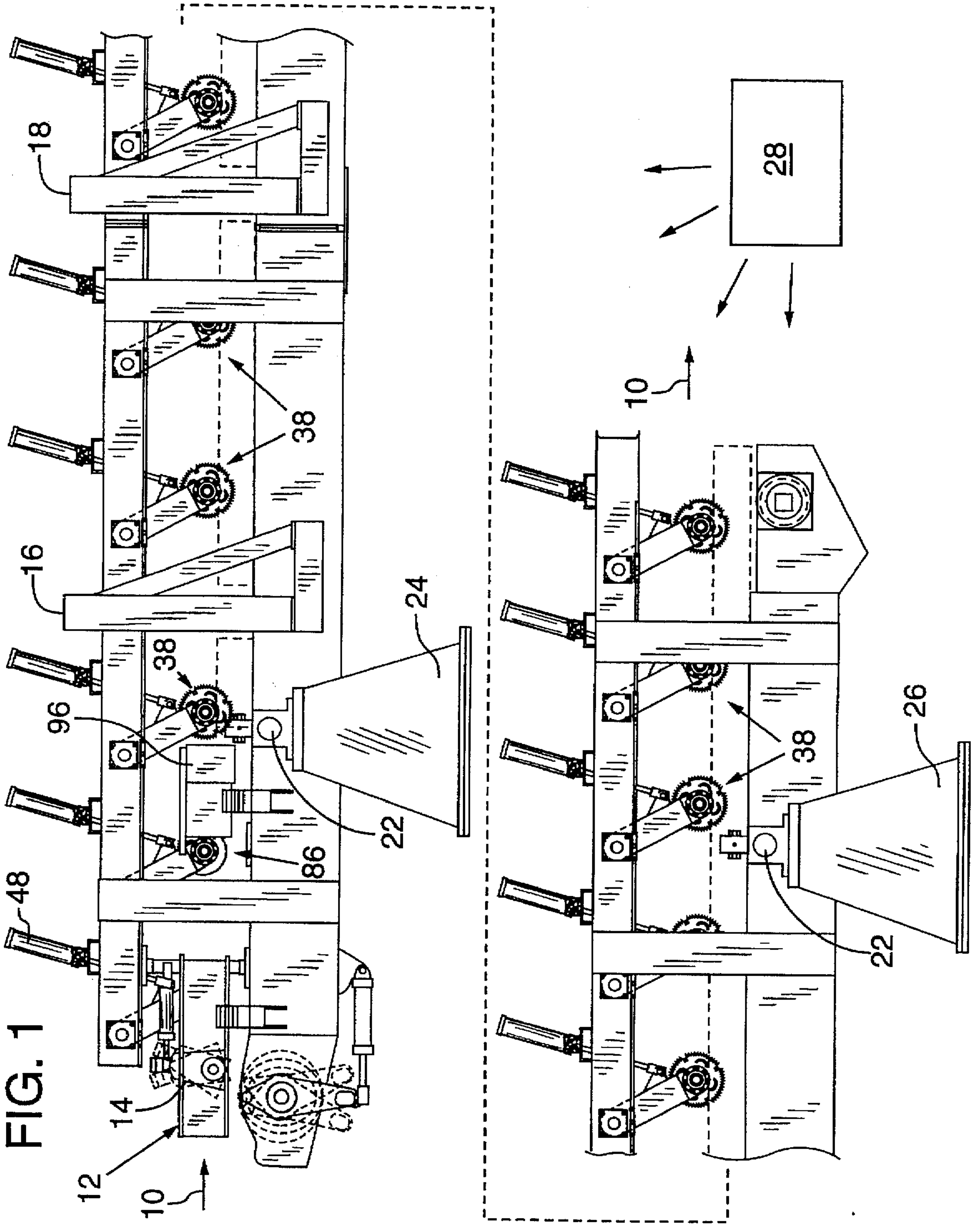
FIG. 1 is a side view of a conveyor system in accordance with the present invention.
Figure 2:
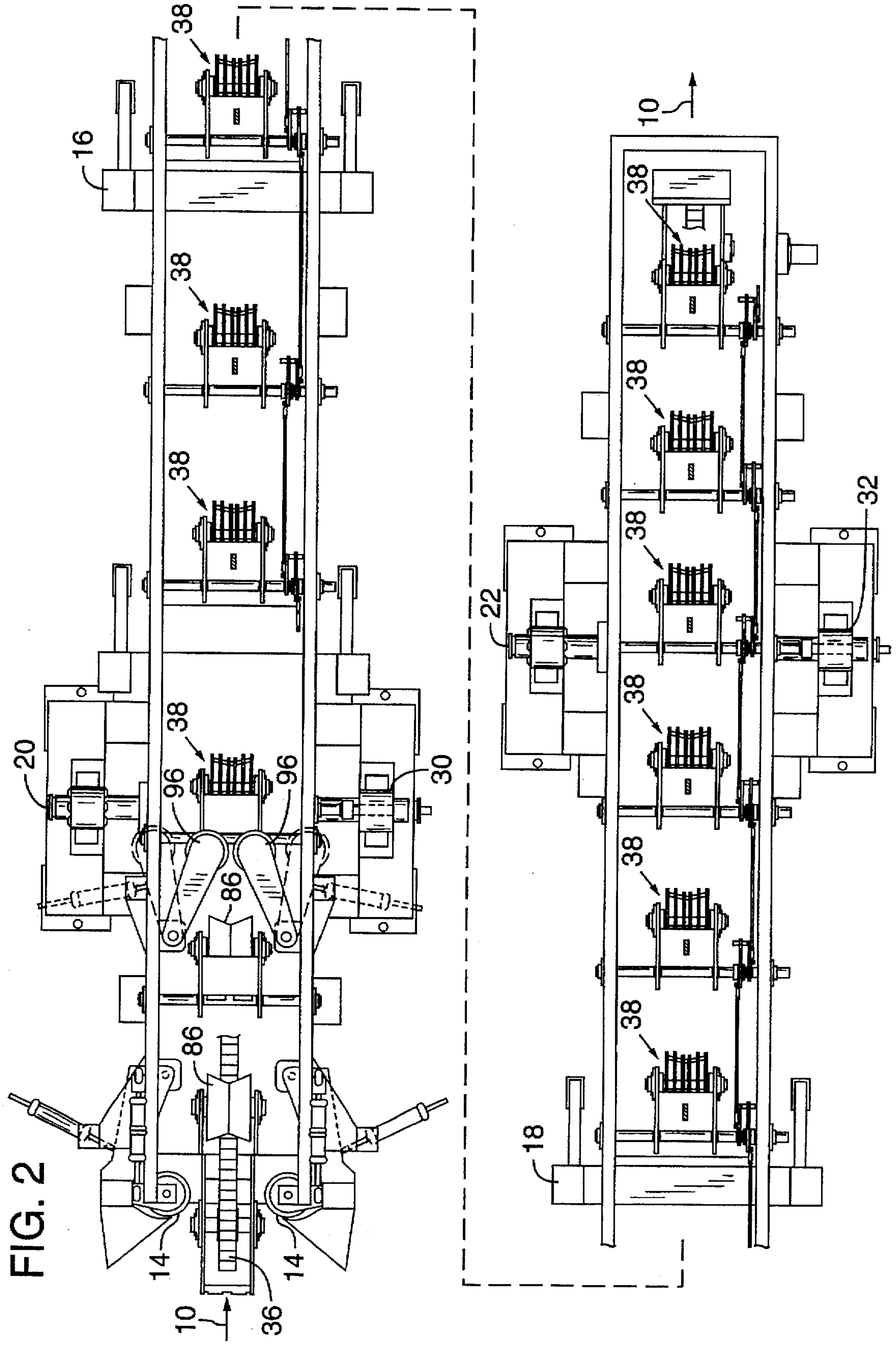
FIG. 2 is a top view of the system of FIG. 1.
Figure 3:
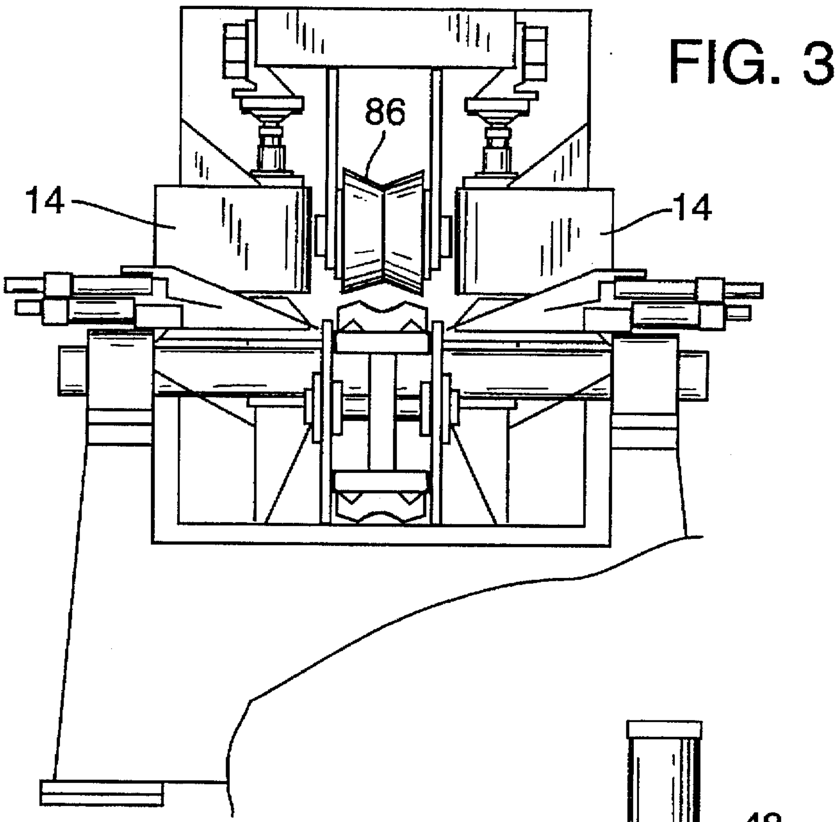
FIG. 3 is a front end view of the system of FIG. 1.

Reference is made to FIGS. 1–3. Illustrated is a log conveyor in accordance with the invention. It will appreciated that logs of varying sizes and shapes are fed sequentially into and through the conveyor from the left or incoming end and into an operating machine, e.g., a band saw, located at the right or outgoing end. Arrows 10 indicate the movement of the log through the conveyor. As each log approaches the incoming end, the logs are analyzed, e.g., by an operator or scanner and the log is rotated about its longitudinal axis by a log turner 12. The log turner includes a pair of vertical side rollers 14 that are cooperatively tilted to cause the log to roll. The log turner is of conventional design and well known to the industry and will not be further explained.

Positioned down stream from the incoming end of the conveyor is a pair of scanners 16, 18. The scanners cooperatively determine the profile of the log. Whereas the first scanner 16 is close to the log turner, the log may not be sufficiently stable to obtain accurate scan data. The second scanner 18 is too close to the outgoing end. The log will not be completely scanned and processed by scanner 18 prior to entry of the leading end into a gang saw. Thus, when a log is detected by scanner 18, the data of scanner 16 generated to that point is cancelled and scanner 18 will rescan that section. The data from the two scanners is combined to obtain the full log profile. Once the trailing end of the log passes scanner 16 the measurements can be evaluated and the desired cut lines determined.

The entire conveyor is mounted on a pair of side shiftable shafts 20 and 22. The shafts are mounted on pedestals 24, 26 and a computer 28 which determines the desired cut lines controls cylinders 30, 32 which side shift the entire conveyor to align the cut lines with the gang saw blade. Again the above features are known to the industry and further detail is not required. However, the reader will appreciate that achieving scan data and shifting the log so as to achieve the desired cutting pattern critically depends on stable conveyance of the log along a predetermined path on the conveyor.

Figure 4:
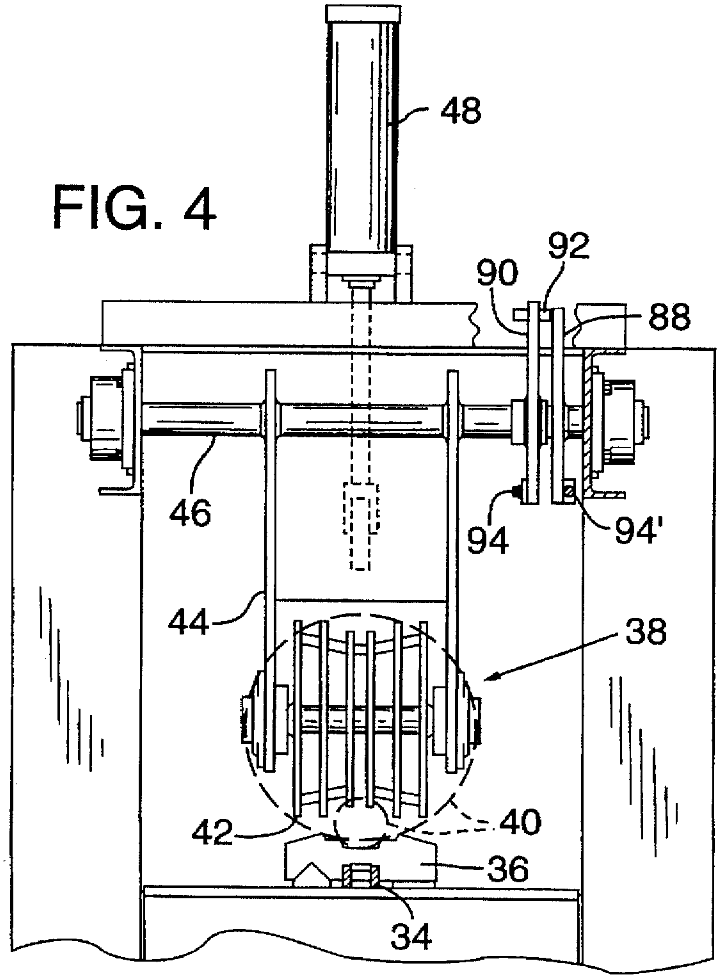
FIG. 4 is a cross section view of one of the roller assemblies as taken on view lines 4—4 of FIG. 7.

The bottom conveying chain 34 is configured to optimize holding of the log in the desired orientation as established by the turner 12. A supporting lug 36 of the conveyor chain 34 is illustrated in FIG. 4. Also illustrated in FIg. 4 is a hold down roller 38 which is pressing down on a log 40. As will be noted, the hold down roller includes six gripping disks 42 having peripheral teeth or serrations, with the two inner disks 42 of smaller diameter to form a V or curved shape that essentially conforms to the rounded top of a log. Arms 44 support the roller 38 and permit pivotal vertical movement of the roller by reason of its pivotal connection about shaft 46. Everything described in this detailed section to this point is substantially known and reference will now be made to the features of the invention most clearly depicted in FIGS. 4–9.

Figure 6:
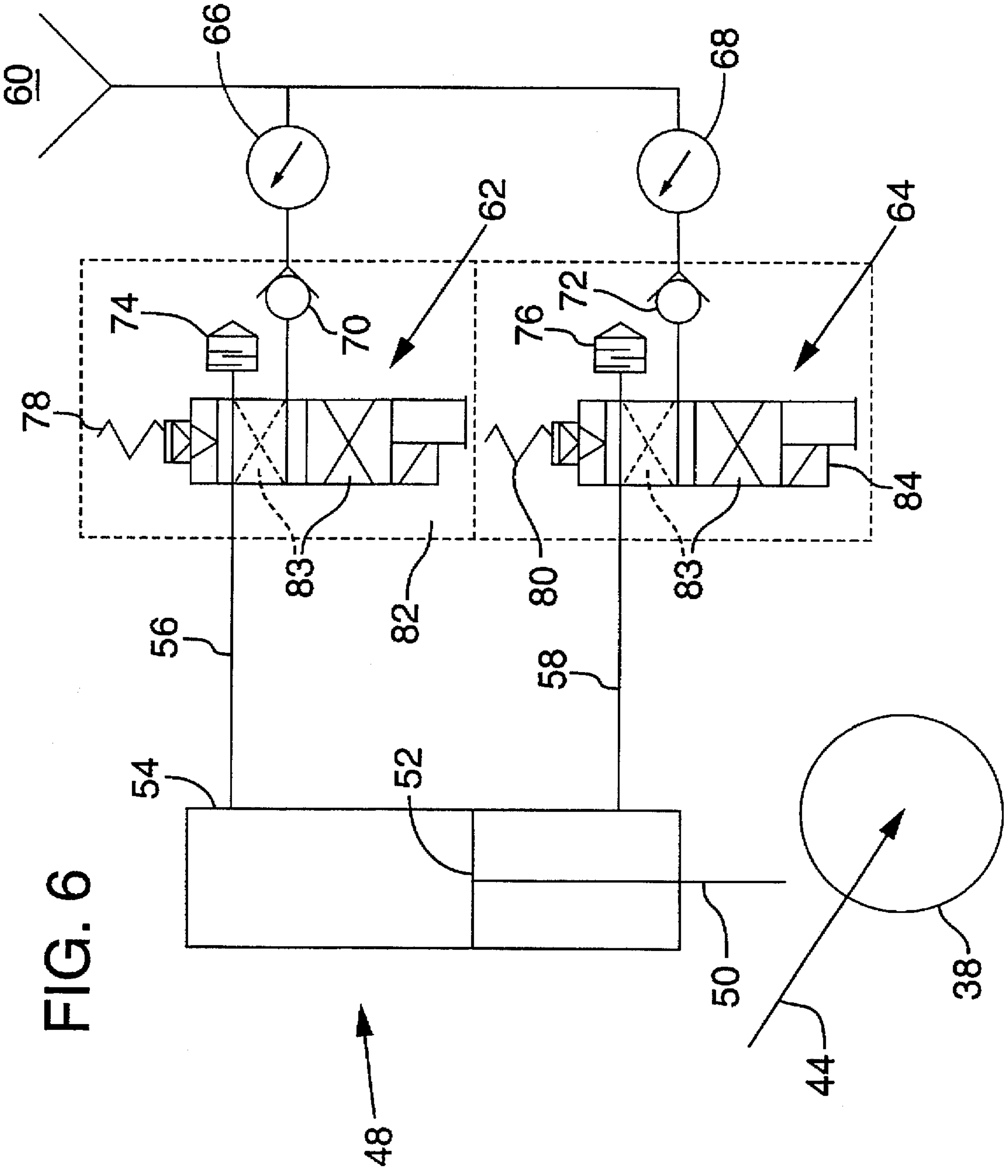
FIG. 6 is a schematic illustration of an air cylinder actuator as used in the system of FIG. 1.

Reference is now made to FIG. 6 which schematically illustrates an air cylinder actuator 48 used to power or actuate the hold down rollers 38. The air cylinder actuator 48 includes a rod 50 attached at its upper end to a piston 52 and its lower end to an arm 44 of a roller 38. The piston 52 moves up and down inside cylinder 54 and rod 50 correspondingly moves up and down to cause pivotal raising and lowering of the hold down roller 38. An air conduit 56 is connected to the top half of the cylinder and air conduit 58 is connected to the lower half of the cylinder 54.

An air pressure source 60 provides air pressure to both air conduits 56, 58 through valves 62, 64. Air pressure to valves 62, 64 is regulated by regulators 66, 68 with air flow to the valves 62, 64 being one way as dictated by check valves 70, 72. Valves 62, 64 are shown in their closed position, i.e., disconnected from the air source and connected to adjustable exhausts 74, 76 as urged by springs 78, 80. The valves 62, 64 are independently opened by energizing selectively the solenoids 82, 84.

As shown the cylinder actuator 48 is at rest and both sides of piston 52 are exposed to ambient air. Energizing solenoid 82 raises the portal carrier 83 of the valve to the dash line position and connects conduit 56 to the air pressure source 60. Air pressure is created in the upper side of piston 52 to force the piston and the roller 38 to which it is connected to move down. Opening valve 64 will equalize the pressure on the top and bottom sides of the piston to stop the movement of the piston and roller 38. (Regulators 66, 68 are provided to enable adjustment of the air pressure between the two sides to insure that the open position on both sides of the piston produces stabilization of the piston.) The piston is raised by opening the upper valve 62 (de-energizing solenoid 82). The roller 38 can thus be set at any position within its range of movement (as enabled by the stroke distance of piston 52) and it can be moved down or up from whatever position it resides through selected energizing and de-energizing of solenoids 82, 84.

Figure 5:
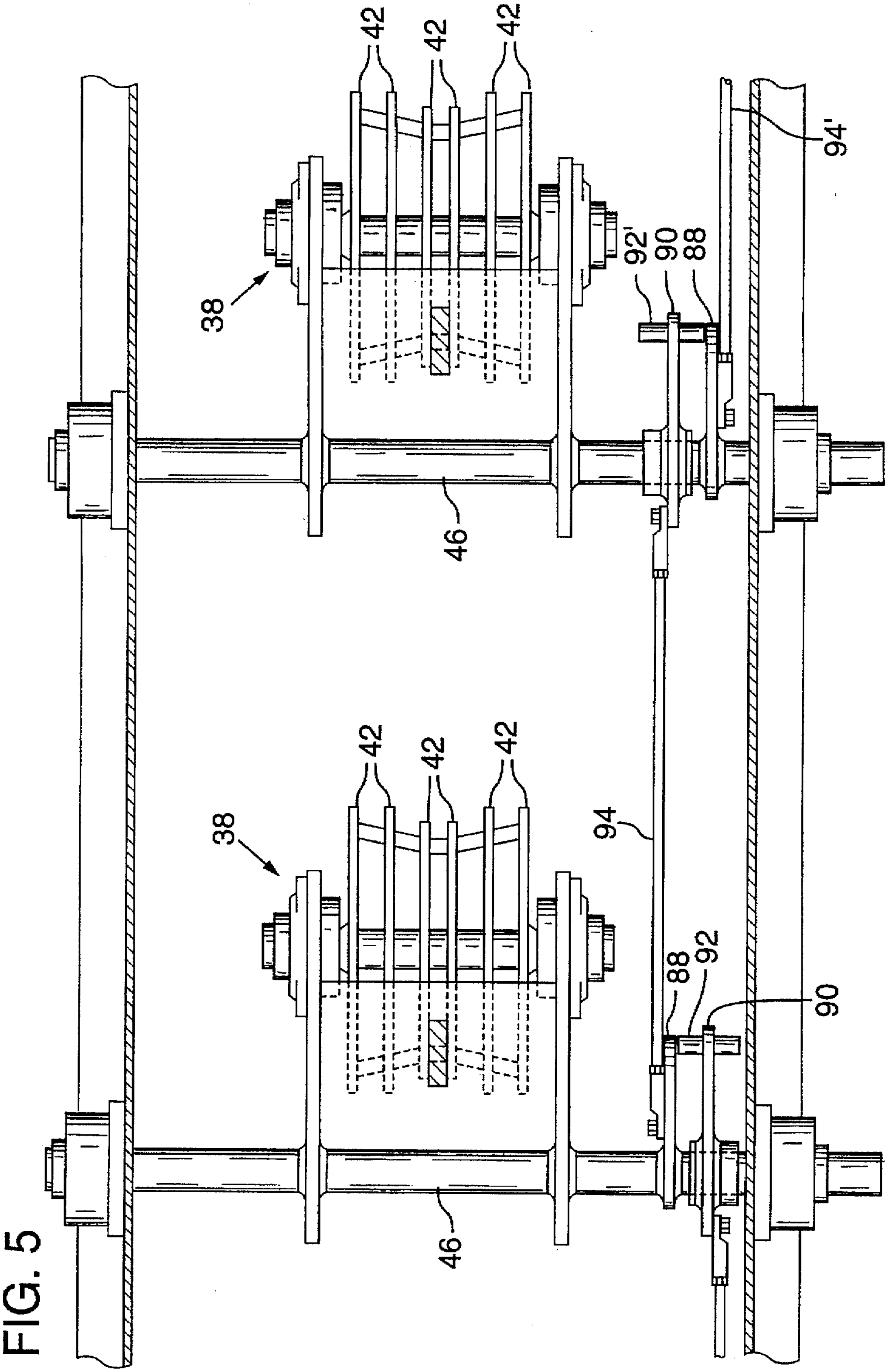
FIG. 5 is a top view of a pair of roller assemblies.
Figure 7:
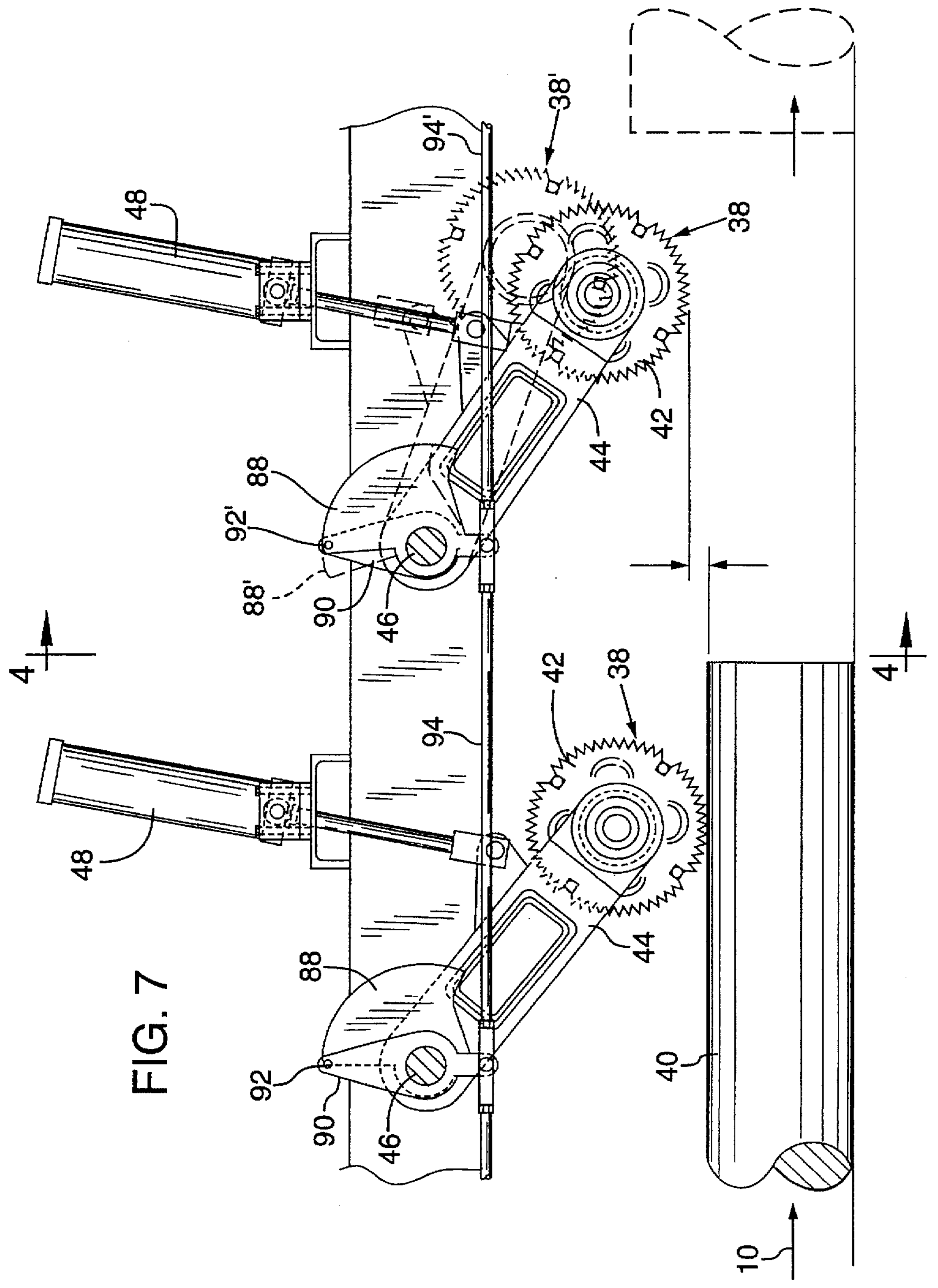
FIGS. 7, 8 and 9 are side views of a pair of the roller assemblies of FIG. 1 illustrating their operation.

Reference is now made to FIGS. 4, 5 and 7. Illustrated are two rollers 38 each made up of six disks 42 having peripheral teeth that resist lateral shifting or rolling of the log. (These rollers are sometimes hereafter referred to as serrated rollers.). As will be explained hereafter, the rollers that initially engage the log upon entry of a log onto the conveyor are referred to as hour glass rollers 86 which have a smooth gripping surface and allow the log to be rolled by the turner to the desired rotative orientation and when gripped by the serrated surface of the rollers 38 are held in that rotative orientation. A Roller 86 is the first to contact the log end and generates the initial setting of the first serrated roller 38.

Returning to FIGS. 4, 5 and 7 and referring to the right roller of FIGS. 5 and 7, connected to shaft 46 (on which arms 44 carrying rollers 38 are pivotally mounted) is a configured metal plate 88 which functions as a proximity switch actuator. Plate 88 is clamped to the shaft 46 and thus pivots around the shaft as the shaft is rotated. Also connected to shaft 46 is an arm 90 carrying a proximity switch 92. The arm 90 pivots freely on the shaft. A linkage rod 94 is connected between the arm 90 and the plate 88 of the prior roller (the left roller). A second linkage rod 94' is connected between plate 88 and arm 90 of the succeeding roller (not shown). It will thus be seen that every roller assembly includes a plate 88, an actuator arm 90 carrying a proximity switch 92, and a first linkage rod 94 that interconnects the arm 90 with a prior plate 88, and a second linkage rod 94' that interconnects the plate 88 with a succeeding arm 90.

As shown in FIG. 7, the left roller 38 is engaging a log, i.e., cylinder actuator 48 has been actuated to drive the arms 44 and consequently roller 38 down into engagement with the leading end of log 40. The arms 44 are fixedly secured to shaft 46 and thus the pivotal movement of arms 44 also rotates shaft 46. Plate 88 has been pivoted with the shaft and through linkage rod 94 has pivoted arm 90 of the succeeding roller assembly.

Still referring to FIg. 7, roller 38 and plate 88 of the succeeding roller assembly was, prior to presetting, at the position shown in dash lines. The arm 90 as dictated by its connection to the preceding roller, has been set to the position following engagement of the left roller as previously explained. In this initial position (i.e., after engagement by the left roller and prior to presetting of the right roller) the proximity switch 92 is covered by plate 88. The switch 92 signals the computer 28 to lower the right roller via actuation of cylinder 48, until the switch 92 is uncovered and then stopped. The relation of the plate 88 of the left roller assembly and the arm 90 of the right roller assembly is such that with the switch 92 on arm 90 adjacent the edge of the plate 88, the roller 38 of the succeeding roller assembly is located at a height of about 2–3" higher than the prior roller. This is the desired position for actuation of the engagement cycle, i.e., when the log 40 moves under the succeeding roller, its air cylinder 48 is signalled (by the computer) to descend into log engagement. This movement includes the plate 88 which pivots the arm 90 of the next succeeding roller assembly (not shown) and then it moves into the preset position, e.g., 2–3" above the projected contact point.

Although not illustrated, it will be understood that had the roller 38 of the succeeding roller assembly been lower than the desired preset position, the proximity switch, not seeing the metal plate, would have signalled the computer to raise the roller 38 until the proximity switch of arm 90 sees the metal plate, at which point, the movement would have stopped again at 2–3" distance above the point of engagement.

Operation

Reference is made to FIGS. 1, 2, 7, 8 and 9 for explanation of the operation of a specific conveyor system that has been constructed and operated. As will be apparent from FIG. 1, logs are sequentially fed as indicated by arrow 10 into the conveyor system. Center rolls 96 center the rolls as hour glass hold down rollers 86 press the log onto the conveyor chain lugs 36. The logs are fed through the conveyor at speeds ranging from between 150–350 feet per minute. The logs range in size from 4"–20" in diameter and 8'–20' in length. Although not shown, sensors (photocells) identify the leading and trailing ends of each log and knowing the rate of travel through the conveyor enables the computer 28 to know the position of these leading and trailing log ends throughout their period of conveyance through the conveyor system.

As previously described, the first hour glass roller 86 is actuated in a conventional manner. That is, it is actuated by a single or double two position cylinder(s) that rapidly moves the roller into engagement with the log end. The location from the exact leading and may vary but the reading will be satisfactory for setting the succeeding roller.

Each succeeding serrated roller is preset as the prior roller engages the log and as the log end approaches each serrated roller, the cylinder of the roller is actuated to rapidly move the roller from its position 2—3" above the log end into engagement with the log end.

It is desirable to have at least two rollers pressing down on the log at all times. Whereas the minimum length log is 8', the spacing between the rollers is 40". This allows momentary engagement by three rollers, i.e., the next roller can engage the leading end of the log before the last roller reaches the trailing end of the log. As a log approaches a "next" roller, that roller must engage the log within about the first 10" or the rearmost roller will release the log before the "next" roller engages it and in such event, there would only be one roller engaging the log. This was a problem with prior systems, e.g., when a roller had to engage, e.g., a minimum diameter log of 4" from a height of e.g., 26". During the time of 20+ inches movement of the roller, a log moving a maximum speed of 350' per minute could well exceed the permitted 10" tolerance provided by the 40" roller spacings. Spacing the roller assemblies any closer than 40" is impractical.

In the present invention, as each roller is released from the log, that roller merely holds its position until the signal is received for the next preset position. While the roller is pressing down on the log, the bottom half of the air cylinder is vented. As the roller reaches the trailing end of the log, the bottom half of the cylinder is pressurized to hold the roller at the position of final engagement. The present system accordingly does not provide for increased movement of the rollers and in fact requires less movement. The computer and the appropriate controls move the rollers to their preset position as the log is engaged by the preceding roller, and based on the known relationship of the log end to that roller, the computer moves the roller to the engagement position. Previously a roller was moved to its fully retracted position upon release of the roller from the trailing end of the log and then to the engagement position from its maximum retracted position upon movement of a subsequent log into engagement range.

As previously explained, the leading end of the log passes through scanner 16 and 10' further down stream it passes through scanner 18. The scanner 16 is positioned too close to the log turner to reliably obtain data from the leading end of the log. Scanner 18 is positioned too close to the outgoing end of the conveyor to obtain the data from a 20' log (the maximum length for the illustrated system) to enable alignment of the log with, e.g., a band saw or gang saw following scanning and analysis. Thus, the first scanner 16 voids the data it receives from the first 10' and scanner 18 retains only the data from the first 10'. The combined information provides the needed information to enable computation of the desired cut lines which computation can take place as soon as the trailing end of a log passes scanner 16. The entire conveyor is then side shifted by movers (cylinders) 30, 32 to establish the desired alignment with the band saw.

Figure 8:
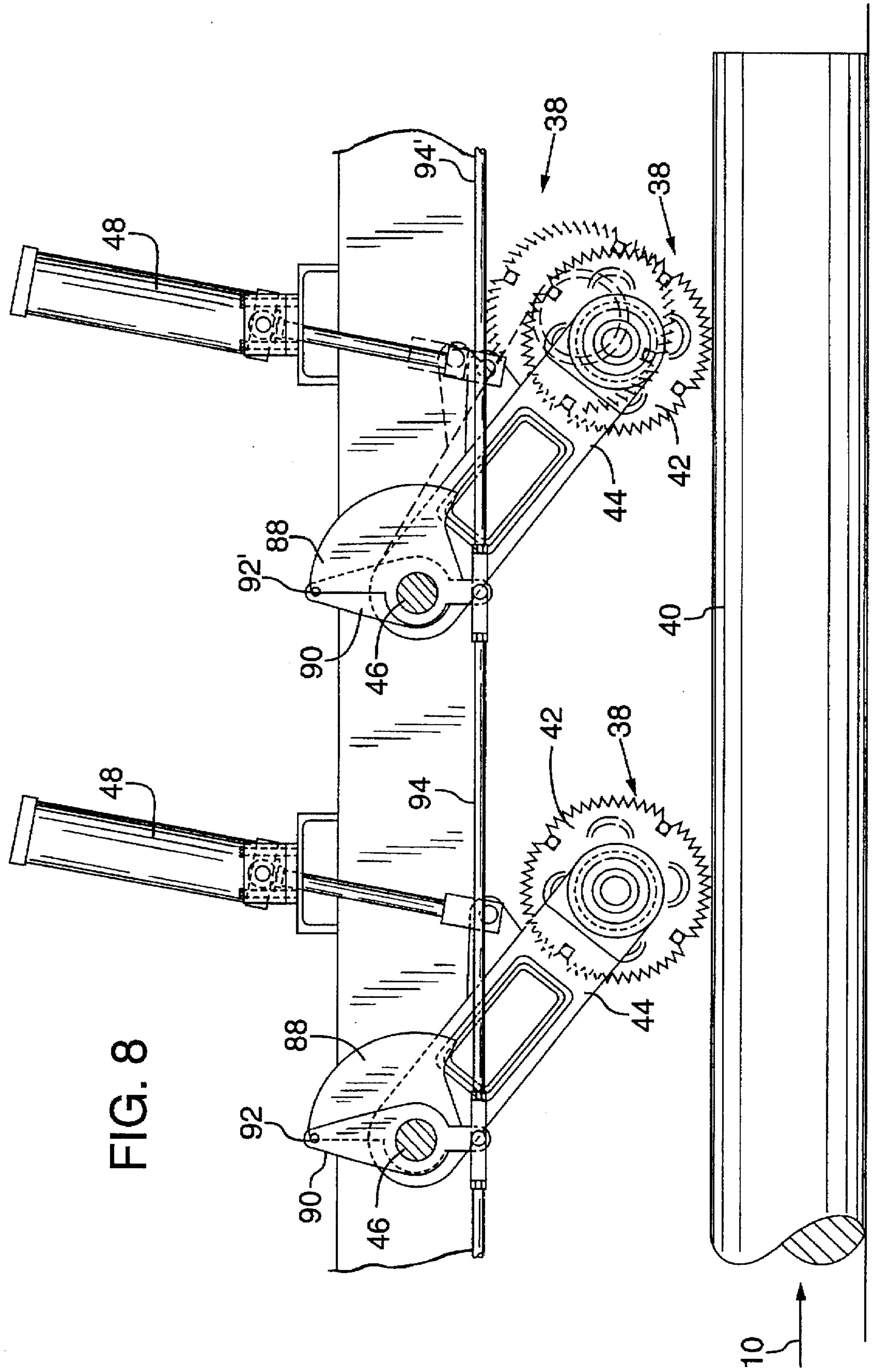
Figure 9:
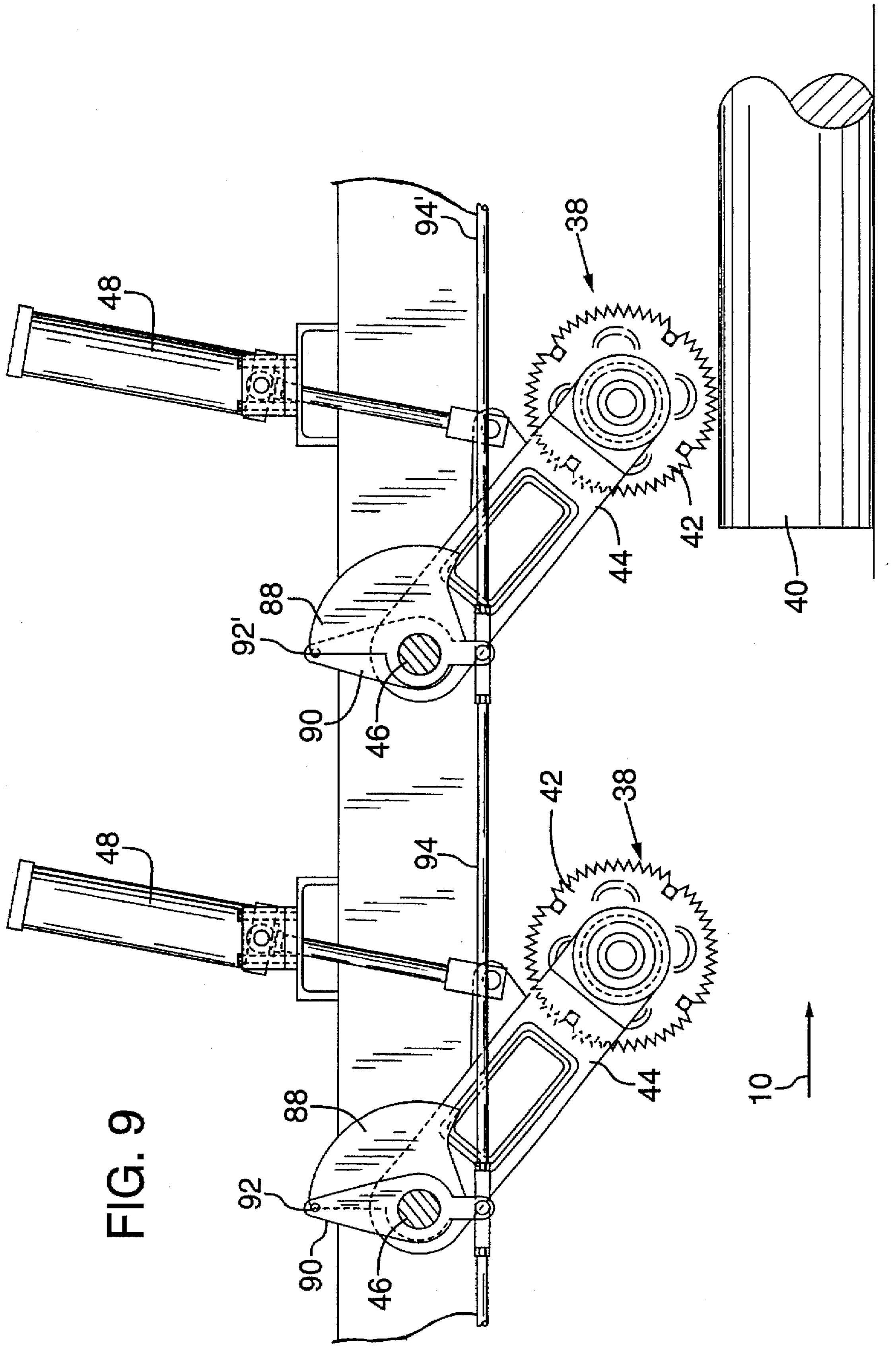

It will be understood by those skilled in the art that the computer receives information and issues the appropriate commands in accordance with known computer programming skills. The computer receives the signal from the proximity switch of a roller assembly at the point where it knows the prior roller has engaged a log end. It then issues the command for presetting the subsequent roller position as illustrated in FIG. 7. The computer issues a new command, i.e., for movement from preset to engage position based on the location of the log end as illustrated in FIG. 8. FIG. 9 illustrates that the following roller upon releasing the trailing end of the log, retains that position (the pressure on the two sides of the piston are equalized) until receiving a preset command based on the engagement of the preceding roller with the next log in the sequence.

Numerous variations are possible and will become obvious to those skilled in the art upon review of the disclosure herein. An example of such a variation is for curved log sawing where rollers force the log against a line bar for feeding the log along a curved path into a saw. Rollers again engage and release the log but press laterally against the log rather than vertically. The invention is not limited to the specific disclosure herein but encompasses the scope of the appended claims which follow.

I claim:

1. A conveyor system for conveying lumber pieces including log cants and slabs, which system comprises:

a bottom conveyor supporting and conveying a sequence of lumber pieces having varying heights as measured from a plane defined by the support surface of the bottom conveyor;

an arrangement of hold down rollers sequentially positioned above the conveyor plane, said rollers mounted for vertical movement, and powered movers moving the rollers to selected vertical positions above the conveyor plane;

a first hold down roller adapted for movement to engage the top of a lumber piece at its leading end when conveyed into position under the first hold down roller, a second hold down roller adapted for movement first to a preset position and second to engage the top of the lumber piece at its leading end when conveyed into position under the second hold down roller, and a control for setting the preset position including a first detector that detects the vertical position of the first roller upon engagement thereby with the leading end of a lumber piece, a switch responsive to said detector indicating the desired preset position of the second roller, said switch actuating the movers for moving the rollers to the desired preset position;

said control further responsive to the positions of the log's leading end approaching the preset roller and actuating the mover to move the roller into engagement with the leading end of the lumber piece; and a linkage connected from the first hold down roller to the switch which is located adjacent the second hold down roller, said linkage responsive to movement of the first hold down roller engaging a log end to position the switch, said position of the switch identifying a desired preset position for the second hold down roller and said control responsive to the switch to move the second roller to the preset position.

2. A conveyor system as defined in claim 1 wherein the switch is a proximity switch, a configured plate is carried by the second roller and movable relative to the proximity switch, said plate and proximity switch cooperatively arranged to indicate the desired preset position of the second roller and said control responsive to the arrangement of the plate and switch for moving the roller and thereby the plate to the preset position.

3. A conveyor system for conveying lumber pieces including logs, cants and slabs which system comprises:

a bottom conveyor supporting and conveying a sequence of lumber pieces having varying heights as measured from a plane defined by the support surface of the bottom conveyor;

an arrangement of hold down rollers sequentially positioned above the conveyor plane, said rollers mounted for vertical movement, and powered movers moving the rollers to selected vertical positions above the conveyor plane;

a first hold down roller adapted for movement to engage the top of a lumber piece at its leading end when conveyed into position under the first hold down roller, a second hold down roller adapted for movement first to a preset position and second to engage the top of the lumber piece at its leading end when conveyed into position under the second hold down roller, and a control for setting the preset position including a first detector that detects the vertical position of the first roller upon engagement thereby with the leading end of a lumber piece, a switch responsive to said detector indicating the desired preset position of the second roller, said switch actuating the movers for moving the rollers to the desired preset position;

said control further responsive to the positions of the log's leading end approaching the preset roller and actuating the mover to move the roller into engagement with the leading end of the lumber piece; and a plurality of hold down rollers including said second roller arranged sequentially following said first roller, each of said following rollers interconnected to a detector and a switch, the detector detecting the desired preset position of the next succeeding following roller and the switch responsive to a detector connected to a preceding roller for determining that roller's desired preset position.

4. A conveyor system as defined in claim 3 wherein said rollers are mounted on pivotal arms and pneumatic cylinders control the pivoting of the arm and thereby the position of the rollers, said cylinders each having an internal piston movable between a raised and lowered position and air inlets from an air pressure source to both sides of the piston and an exhaust for exhausting air from both sides of the piston, and valves for each air inlet for selectively providing ambient air and pressurized air to one or both sides of the piston for movement up, down or to a preset position within the range of movement of the piston.

5. A conveyor system for conveying lumber pieces including logs, cants and slabs, which system comprises:

a conveyor supporting and conveying simultaneously and sequentially multiple lumber pieces having varying heights as measured from a plane defined by the support surface of the conveyor;

an arrangement of multiple hold down rollers sequentially positioned above the conveyor plane, said rollers mounted for vertical movement, and powered movers moving the rollers to selected vertical positions above the conveyor plane;

a height sensing system determining the height of a leading end of lumber pieces sequentially directed into the conveyor system;

a position detecting system that determines the position of the leading end of lumber pieces sequentially conveyed through the conveyor system;

said powered movers providing individual positioning capability for positioning the respective hold down rollers operationally at substantially any position determined by the variable height of the leading end of the lumber pieces plus a predetermined additional height; and a control system individually controlling the powered movers for independent operation of said powered movers as the multiple lumber pieces are conveyed through the conveyor system for positioning each roller first at an approaching lumber piece height plus the pre-determined height as each lumber piece approaches a roller following engagement of the lumber pieces by the prior roller and then to a lumber piece engagement position as each lumber piece in sequence moves under the rollers.

6. A conveyor system for conveying lumber pieces including logs, cants and slabs, which system comprises:

a conveyor supporting and conveying a sequence of lumber pieces having varying heights as measured from a plane defined by the support surface of the conveyor;

an arrangement of multiple hold down rollers sequentially positioned above the conveyor plane, said rollers mounted for vertical movement, and powered movers moving the rollers to selected vertical positions above the conveyor plane;

a height sensing system determining the height of a leading end of lumber pieces sequentially directed into the conveyor system;

a position detecting system that determines the position of the leading end of lumber pieces sequentially conveyed through the conveyor system;

said powered movers providing positioning capability for positioning the respective hold down rollers operationally at substantially any position determined by the variable height of the leading end of the lumber pieces plus a pre-determined additional height; and a control system individually controlling the powered movers as lumber pieces are conveyed through the conveyor system for positioning each roller first at an approaching lumber piece height plus the predetermined height as each lumber piece approaches a roller and then to a lumber piece engagement position as each lumber piece in sequence moves under the rollers;

said powered movers including a cylinder and piston and fluid inlets into the cylinder above and below the piston and said control system including control valves selectively controlling fluid to the inlets for precise setting of the piston in the cylinder and accordingly precise unlimited settings of the hold down rollers.

* * * * *